(No Model.)
R. W. DIXON.
WHEEL.
No. 478,577.
Patented July 12, 1892.
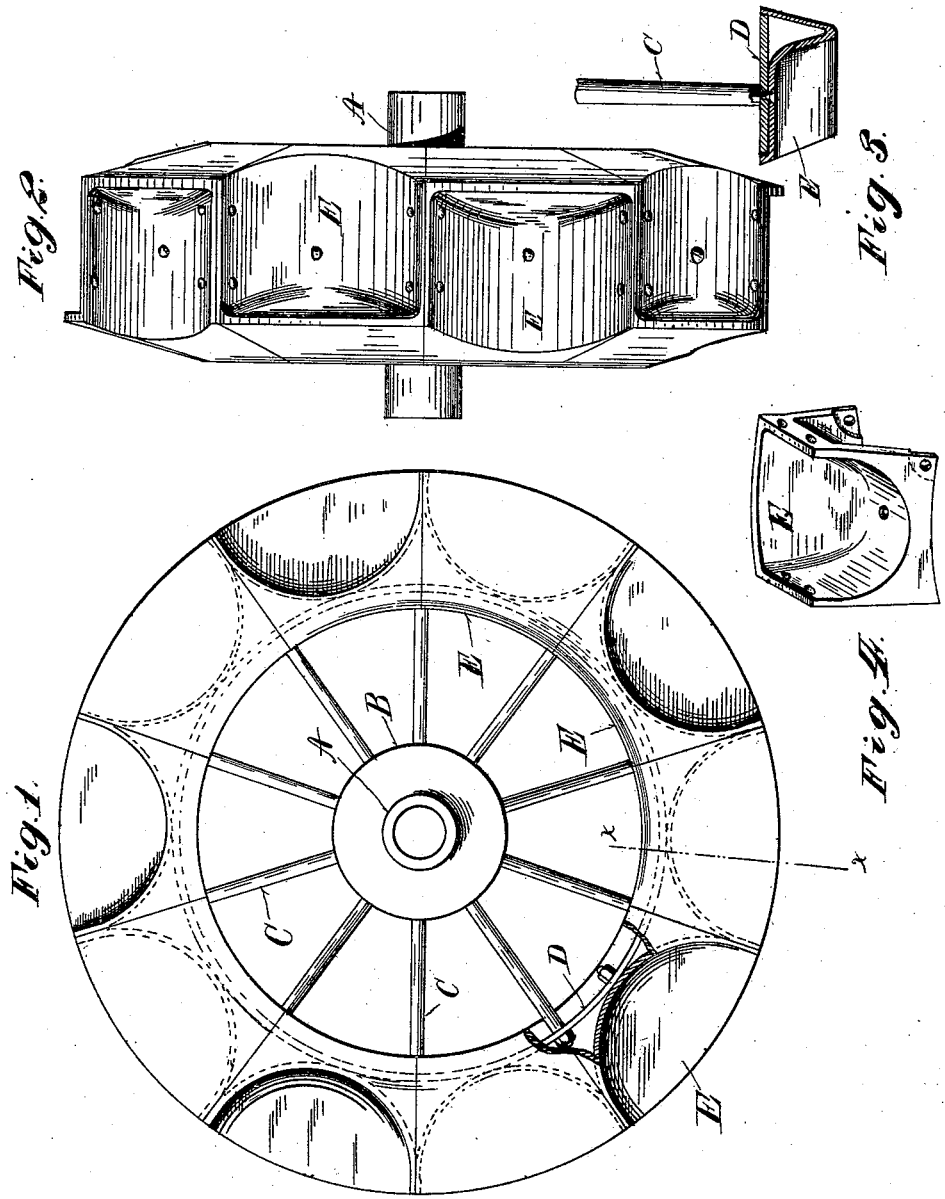

UNITED STATES PATENT OFFICE.

ROBERT W. DIXON, OF SPRINGFIELD, OHIO.

WHEEL.

SPECIFICATION forming part of Letters Patent No. 478,577, dated July 12, 1892.

Application filed March 24, 1892. Serial No. 426,181. (No model.)

*To all whom it may concern:*

Be it known that I, ROBERT W. DIXON, a citizen of the United States, residing at Springfield, in the county of Clark and State of Ohio, have invented certain new and useful Improvements in Wheels, of which the following is a specification, reference being had therein to the accompanying drawings.

My invention relates to certain new and useful improvements in wheels, being especially adapted for the traction-wheels of rice-harvesters or other machines operating in muddy adhesive ground liable to stick to and clog the wheel.

My improvements have reference to the formation of a cup-shaped periphery or rim constituting a continuous circular outline for rolling on hard ground and a series of cup-shaped segments for operating in muddy ground, said segments being open at one side; have reference to a wedge-shaped form of cross-section for said rim constituting a draft or draw in clearing the wheel from the mud; have reference to forming said rim by a combination of reversible segments, whereby the continuous rolling circle may be zigzag or in one plane, and have reference to other points of detail hereinafter pointed out in the claims.

In the accompanying drawings, on which like reference-letters indicate corresponding parts, Figure 1 represents a face view of a wheel of my construction in the preferred zigzag arrangement of parts; Fig. 2, an edge view of the same; Fig. 3, a sectional view of the rim on a line $x\ x$ of Fig. 1, and Fig. 4 a perspective view of one segment.

In rice-fields the mud, being spongy and adhesive, allows the wheels of the rice-harvester to sink therein and adhering thereto clogs them. Various forms of wheels have been contrived to overcome this difficulty; but they allow the wheel to sink too readily, the mud to force up through the interstices of the rim, present no proper clearance for the sides of the rim or give trouble in other ways. My device is adapted to prevent the oozing upward of the mud to the inside of the rim while presenting a series of cup-shaped segments, which, being open at one side, do not disconnect the mud from its parent soil, thus readily clearing the cups. The sides of the rim in my device are flared outwardly as they approach the center and are of sufficient height to prevent the mud reaching the inner side of the rim, and the cups, being made in segments, may be readily mounted on the wheel-rim of the skeleton frame and facilitate the manufacture by their uniformity.

Referring to the drawings, the letter A designates the shaft or journal of the machine on which the wheel is mounted, and the letter B a hub having the spokes C, connecting with the skeleton rim D in the usual manner. On this skeleton is mounted the rim proper, constituted by a series of cup-segments E, bolted to the skeleton and also to each other or fastened together in any other convenient manner. One of these segments is shown detached in Fig. 4. It consists of a cup-shaped indentation open on one side and closed on the other, the surfaces blending into each other to prevent lodgment of the mud therein, the open side of the cup allowing the mud within the cup to remain connected with the earth. Since the cup is closed, no mud can be forced up through it, as in some forms of wheels previously used, in which perforations are formed in the rim to allow the air to enter. In my form there are no such openings through which the mud clinches. The side of the cup being open does not separate the mud in the cup from the rest of the earth, but causes its withdrawal as the wheel rotates. The sides of the segments extend up beyond the cup a suitable distance to prevent the mud forcing over the edge of the rim. The sides are also flared outward, as seen in Figs. 2, 3, and 4, whereby as the wheel rotates it clears itself from the mud. Thus the sides are kept free. The side of the segment that closes the cup is tapered on the outside to give the draw or clearance above mentioned and rounds or blends inward to the surface of the cup, as seen in Fig. 3, to do away with sharp corners at the bottom of the cup and prevent lodgment of mud. This side is also in the arc of a circle the size of the wheel, and the contour is continued by the adjacent segments, the walled-up sides being alternating and constituting a zigzag face, as shown in Fig. 2. The mud is thus more readily drawn from the cups, while the circular shape of the wheel is preserved, as seen in Fig. 1, for traveling on hard ground.

The rim is made in segments of single buckets or other convenient number to facilitate the manufacture of the wheel. One pattern of a cup thus serves for the whole wheel. This is a large saving in this direction. As the segments are shown in the drawings, the tread of the wheel may be zigzag, or if the buckets all open on one side the walled-up side of each will be in the same plane. In either case, however, the wheel will have the draw or clearance at the sides of the rim, and the mud will find no entrance or opportunity to clinch itself in the rim.

While I have illustrated the preferred zigzag form of tread and the special form of segment above described, I do not limit myself to the exact construction as long as the principles hereinbefore pointed out are carried out.

I wish to be understood as laying claim, broadly, to a rim having these cup-shaped recesses or indentations open at alternate sides, as above described; also, to the draw given to the rim of the wheel by the flaring form of sides; also, to the sides extending upward beyond the recesses of the rim, which, together with the non-perforated periphery, gives no opportunity for the mud to force up beyond the rim or clinch itself on the other side thereof.

Having thus fully described my invention, what I claim as new, and desire to secure by Letters Patent, is—

1. In a rice-harvester, the combination, with a wheel-center, of a rim mounted thereon, consisting of cup-shaped indentations, open at alternate sides and presenting a continuous circular contour by the remaining side walls of said cups.

2. In a wheel, the combination, with a wheel-center, of a rim therefor, having cup-shaped indentations open at alternate sides and alternately arranged, the other side of each cup constituting a circular contour for rolling on hard ground.

3. In a wheel, the combination, with a wheel-center, of a wheel-rim having cup-shaped indentations or recesses open at alternate sides and alternately arranged on said rim, the other side of each recess forming a circular contour for the wheel and connected by the edges of said cup-shaped indentations or recesses to constitute a zigzag tread.

4. In a wheel, the combination, with a wheel-center, of a rim therefor having cup-shaped indentations open at the sides, the opposing side being flared outward toward the center to give clearance to the rim.

5. In a wheel, the combination, with a wheel-center, of a rim therefor having indentations or recesses open at alternate sides and closed by a wall at the other side and regularly disposed on said wheel, the said walls of the wheel-rim having an incline or flare outwardly as they approach the center, whereby a draw or clearance is given to said rim.

6. In a wheel, a rim having an outward flare on the sides thereof as it approaches the center to give a clearance or draw thereto, for the purpose described.

7. In a wheel, a rim having cup-shaped recesses open at alternate sides and closed at the other to facilitate the withdrawal of mud forced therein as the wheel travels along the soft ground.

8. In a wheel, a rim formed in segments, each segment provided with one or more cup-shaped recesses open at one side and closed at the other, substantially as shown and described.

9. In a wheel, a rim formed in segments, each segment having one or more cup-shaped recesses open at one side and provided with inclined side walls constituting the rim proper to afford clearance to the wheel.

10. In a wheel, a rim formed in segments, each segment being provided with a recess open at one side and closed by the said wall of the rim at the other side and adapted to be secured to adjacent segments to constitute an alternate or uniform arrangement of recesses, respectively.

In testimony whereof I affix my signature in presence of two witnesses.

ROBERT W. DIXON.

Witnesses:
AL. H. KUNKLE,
WARREN M. McNAIR.